United States Patent Office 3,075,991
Patented Jan. 29, 1963

3,075,991
BENZIMIDAZOLYLALKYLBENZENE-
SULFONAMIDE COMPOUNDS
Clarence L. Moyle, Clare, and Diomed M. Chern, Midland, Mich., assignors to The Dow Chemical Company, Midland, Mich., a corporation of Delaware
No Drawing. Filed Jan. 20, 1960, Ser. No. 3,493
11 Claims. (Cl. 260—309.2)

This invention is directed to sulfonamide compounds represented by the formula

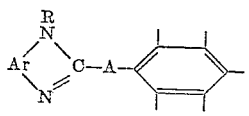

wherein Ar represents an o-arylene radical; A represents a lower alkylene radical; R represents hydrogen, a lower alkyl radical or a substituted lower alkyl radical; one of the free valences in the phenyl ring is satisfied by a —$SO_2B$ radical wherein B represents an amine or substituted amino group, and the remaining valences are satisfied by radicals selected from hydrogen, chloro, bromo and methyl. By the expression "o-arylene" is meant o-phenylene, o-naphthylene and substituted o-phenylene and o-naphthylene. By the expression "substituted amino" is meant lower alkylamino, di-(lower-alkyl)amino, cycloalkylamino, anilino, aralkylamino, substituted lower alkylamino, substituted di-(lower-alkyl)amino and amino groups in which the amino nitrogen is interconnected by an alkylene or heteroalkylene chain to form a ring.

The products of this invention are white or light colored solids soluble in solvents such as acetone, alcohols, and dimethylformamide and of low solubility in water and xylene.

The compounds of the present invention have many biological applications. The compounds are particularly useful in exploring biological mechanisms in laboratory animals. Thus, certain of the compounds may be employed to explore the relative role of electrolytes in the homeostasis of the organism. Others of the compounds may be employed to explore the vascular effects of various hormones and drugs. The compounds are also useful as parasiticides and may be employed as toxic constituents in coccidiostat and anthelmintic compositions. In addition, the compounds are useful as flotation agents in ore recovery, as antioxidants, and as corrosion inhibitors.

The compounds of particular interest are (a) compounds represented by the formula

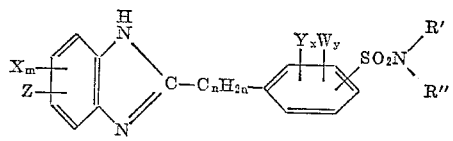

and (b) mineral acid salts of these compounds, wherein X is hydrogen, methyl, ethyl, chloro or bromo; Z is hydrogen, nitro, amino, hydroxy, butyl, propyl, carboxy, carb-lower alkoxy containing from 1 to 5 carbon atoms, inclusive, carbamoyl, alkali metal-oxycarbonyl, ammonium-oxycarbonyl, lower-alkylammonium-oxycarbonyl, lower hydroxyalkyl-ammonium-oxycarbonyl or lower alkoxy containing from 1 to 4 carbon atoms, inclusive, Y is hydrogen, bromo or chloro, W is hydrogen or methyl, R' is hydrogen or lower alkyl containing from 1 to 4 carbon atoms, inclusive, R" is hydrogen, cyclohexyl or lower alkyl containing from 1 to 4 carbon atoms, inclusive, or R' and R" taken together is cyclopentylene; $m$ is 1 or 2; $x$ is 1 or 2; $y$ is 1 or 2; and $n$ is an integer of from 1 to 3, inclusive. By "alkali metal-oxycarbonyl" is meant the radical, —COOM, wherein M is alkali metal such as sodium, potassium and lithium. By "ammonium-oxycarbonyl," "lower-alkyl-ammonium-oxycarbonyl" and "lower-hydroxyalkylammonium-oxycarbonyl" are meant radicals which may be defined by —COOD wherein D is unsubstituted ammonium or ammonium which has been substituted with one or more lower alkyl- or hydroxyalkyl-groups such as methylammonium, ethylammonium, dimethylammonium, bis(2-hydroxyethyl)ammonium, trimethylammonium, triethylammonium, propylammonium, ethyl(2 - hydroxyethyl)ammonium, 2 - hydroxypropylammonium, tris(2-hydroxyethyl)ammonium, butylammonium isopropylammonium, dibutyl(2 - hydroxyethyl)ammonium diisobutylammonium, tri(normal-butylammonium) and isopropyl(2-hydroxyethyl)ammonium.

The products of this invention may be prepared by a method in which the appropriate o-phenylenediamine is reacted with the appropriate sulfamoylphenylalkanoic acid in the presence of an acid catalyst. In the synthesis the following sequence of steps is employed:

(1) A phenylalkanoic acid is reacted with chlorosulfonic acid to produce an intermediate chlorosulfonylphenylalkanoic acid

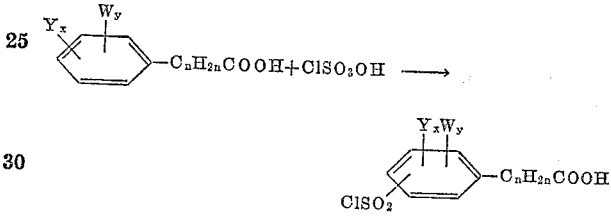

(2) The intermediate chlorosulfonylphenylalkanoic acid is reacted with an ammonia compound to produce an intermediate sulfamoylphenylalkanoic acid. By "ammonia compound" is meant ammonia, primary or secondary amine

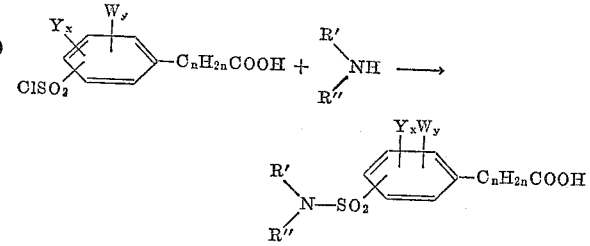

(3) The intermediate sulfamoylphenylalkanoic acid is reacted with an appropriate o-phenylenediamine to produce the desired sulfonamide compound

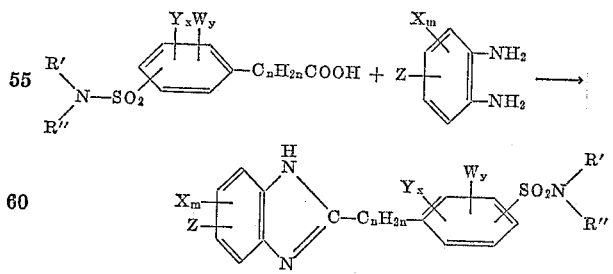

In the above formulas, R', R", X, Y, W, $m$, $n$, $x$ and $y$ have the same significance as previously set forth, and Z represents hydrogen, nitro, butyl, propyl, amino, hydroxy, carboxy or lower alkoxy containing from 1 to 4 carbon atoms, inclusive.

(4) When Z represents carbalkoxy, carbamoyl, alkali metal-oxycarbonyl or ammonio-oxycarbonyl, the appropriate carboxy-substituted compound prepared according to steps (1), (2) and (3) is reacted with an appropriate lower alkanol, ammonia, alkali metal hydroxide or amine base (a)

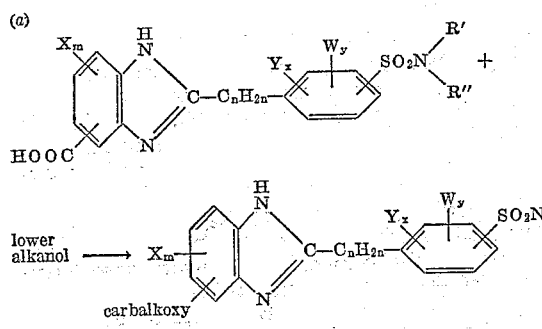

carbalkoxy (b)

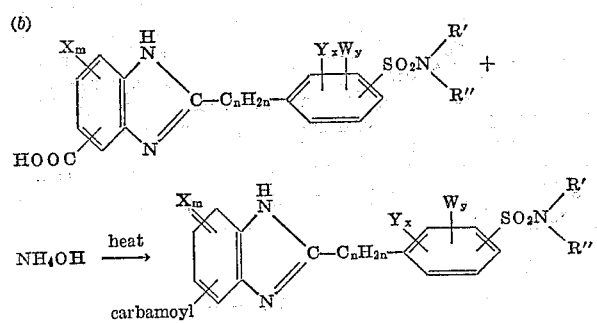

carbamoyl (c)

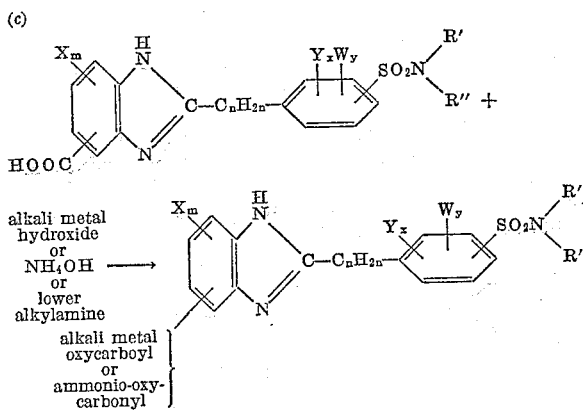

alkali metal oxycarboyl or ammonio-oxy-carbonyl (5) When Z represents hydroxy or amino, the sulfonamide compound may be prepared according to (1), (2) and (3) above, or alternatively the appropriate nitro or alkoxy substituted compound prepared according to (1), (2) and (3) above may be further reacted as follows:

(a)

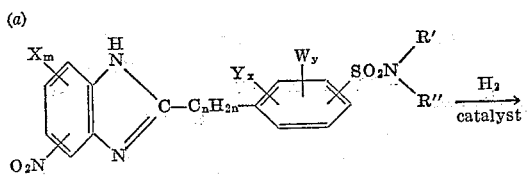

(b)

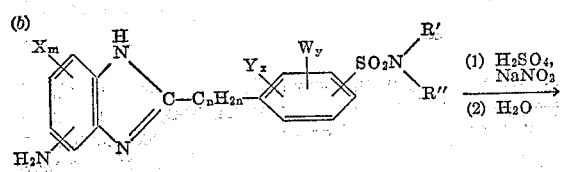

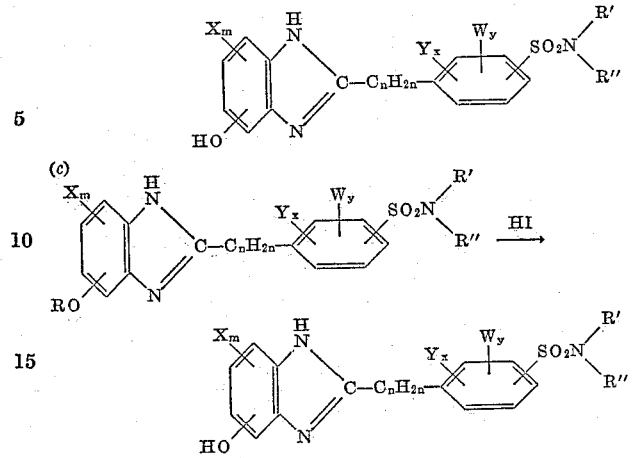

In carrying out the first step of the reaction, a molar excess of chlorosulfonic acid is intimately mixed with a phenylalkanoic acid. It is preferred that a four to fivefold molar excess of the chlorosulfonic acid be employed. The reaction is carried out in the temperature range of from −10° C. to 40° C. for a period of from about 5 minutes to 66 hours. A solvent or liquid dispersion medium such as chloroform sulfur trioxide or carbon tetrachloride may be employed, if desired. In carrying out this step, the phenylalkanoic acid is added to and and intimately admixed with chlorosulfonic acid in the temperature range of from −10° to 15° C. Thereafter, the temperature may be allowed to rise to as high as 40° C. to complete the reaction with the formation of a chlorosulfonylphenylalkanoic acid intermediate product. After completion of the reaction, the reaction mixture is diluted with ice and/or water to precipitate the desired intermediate product as a white or light colored solid. The latter is recovered by filtration and purified, if desired, by conventional procedures.

In an alternative modified procedure the reaction between the chlorosulfonic acid and the phenylalkanoic acid is carried out in the presence of sodium chloride or by first forming the sodium salt of phenylalkanoic acid. In the modified procedure, the preferred ratio of amounts is 5 molar proportions of chlorosulfonic acid to 1 molar proportion of sodium chloride and 1 molar proportion of phenylalkanoic acid. A liquid dispersion medium such as a chlorinated hydrocarbon solvent may be employed. In carrying out this step according to this modified procedure, sodium chloride is added portionwise with stirring to chlorosulfonic acid while the temperature is maintained in the range of from −5° to 10° C. During the addition, hydrogen chloride is formed and exits from the reaction mixture and part of the chlorosulfonic acid is converted to its sodium salt. The phenylalkanoic acid is then added to the resulting mixture while the temperature is maintained between −5° and 15° C. After completion of the addition, stirring is continued while the temperature is gradually allowed to rise to as high as 40° C. and maintained at that temperature for a period of from 3 to 72 hours, preferably from 48 to 72 hours, to complete the reaction with the formation of the chlorosulfonylphenylalkanoic acid intermediate. The intermediate product is then precipitated from the reaction mixture by dilution with water and recovered by filtration as previously described.

In the second step of the reaction, the chlorosulfonylphenylalkanoic acid prepared as above described is intimately mixed with ammonia or the appropriate amine. The reaction is carried out in the temperature range of from about −5° to 90° C. While the amounts of the reactants are not critical, it is preferred that a substantial excess of the ammonia or amine be employed. A solvent is usually employed. If the ammonia compound is water-soluble, water is the preferred solvent. If the ammonia compound is water-insoluble, an organic solvent such as ether or benzene may be employed. In addition, a water-organic solvent mixture may be employed. In carrying out this step, the chlorosulfonylphenylalkanoic acid and ammonia or amine are preferably mixed together in the temperature range of from 0° to 15° C. and thereafter gradually warmed and finally heated on the steam bath (temperature about 90° C.) for from ½ to 2 hours to complete the reaction and to drive off unreacted ammonia or amine. The resulting mixture is acidified with dilute mineral acid to precipitate the desired sulfamoylphenyl-alkanoic acid intermediate as a solid product. The latter may be recovered and purified according to conventional procedures.

In the third step of the reaction, an o-phenylene-diamine and the sulfamoylphenylalkanoic acid intermediate are heated in the temperature range of from about 80° to 110° C. in the presence of a mineral acid. Any dilute mineral acid is suitable for carrying out the reaction, however, dilute hydrochloric acid is considered preferable. The mixture is heated for a period of from 15 to 24 hours to obtain the desired sulfonamide compound which usually remains in solution as the mineral acid salt. The reaction mixture is neutralized with dilute ammonium hydroxide to precipitate the desired sulfonamide compound. The latter is recovered by filtration and purified by conventional procedures.

In the preferred method for carrying out this reaction, 1 molar proportion of sodium chloride is added to 5 molar proportions of chlorosulfonic acid cooled to about 5° C. The resulting mixture is stirred for an additional hour after completion of the addition. One molar proportion of a phenylalkanoic acid is then added portionwise with stirring to the mixture while the temperature is maintained at about 5° C. Stirring is continued at this temperature for several hours and thereafter gradually allowed to rise to room temperature. Thereafter, the mixture is stirred at room temperature for about 72 hours to complete the reaction and to obtain a chlorosulfonyl-alkanoic acid intermediate product. The latter is recovered by filtration and purified, if desired, by conventional procedures. The chlorosulfonylphenylalkanoic acid intermediate is added to excess ammonia or amine while the mixture is maintained at a temperature of about 5° to 10° C. The mixture is then heated at from 80° to 90° C. for a period of from ½ to 2 hours. Thereafter, the mixture is cooled to room temperature and neutralized with dilute mineral acid to obtain a sulfamoylphenylalkanoic acid intermediate which precipitates in the reaction mixture. The latter is recovered by filtration and purified, if desired. The sulfamoylphenylalkanoic acid thus prepared is then heated with an equimolar amount of the appropriate o-phenylenediamine in the presence of dilute hydrochloric acid. The resulting reaction mixture is neutralized with aqueous ammonium hydroxide to precipitate the desired sulfonamide compound. The latter may be recovered by filtration and purified by conventional procedures.

In the preparation of the sulfonamide compounds which have carbalkoxy, carbamoyl, alkali metal oxycarbonyl or ammonio-oxycarbamoyl substituent on the benzimidazole ring, a carboxy substituted sulfonamide compound prepared as above described is employed as reactant and esterification, amidation or salt formation carried out according to conventional procedures.

Thus, in the preparation of carbalkoxy substituted sulfonamide compounds, a carboxy substituted sulfonamide and an excess on a molar basis of the appropriate alkanol may be heated together at reflux temperature in the presence of an anhydrous acid catalyst such as hydrogen chloride and zinc chloride for a period of from 1 to 10 hours. As a result of these operations a reaction takes place and the desired carbalkoxy substituted sulfon- amide compounds precipitate in the reaction mixture and are recovered by conventional procedures.

In the preparation of carbamoyl substituted sulfonamide compounds, a carbalkoxy substituted sulfonamide compound prepared as previously described may be heated with excess ammonium hydroxide under autonomous pressure at about 80° to 120° C. for from 1 to 6 hours. The product resulting from these operations is recovered and may be purified, if desired, by conventional procedures.

In the preparation of alkali metal-oxycarbonyl or ammonio-oxycarbamoyl substituted sulfonamide compounds a carboxy substituted sulfonamide compound prepared as previously described and an appropriate alkali metal hydroxide, ammonium hydroxide, alkylamine or alkanolamine are mixed together at room temperature. The reaction may be carried out in water or organic solvent. If solvent is employed, the solvent is evaporated off and the desired product recovered as residue.

In the preparation of the sulfonamide compounds which have an amino substituent on the benzimidazole ring, the general process above described may be employed using an appropriately substituted phenylenediamine as reactant. Alternatively, a nitro substituted sulfonamide compound may be prepared employing the general process previously described and the nitro substituted sulfonamide compound thus obtained reduced to the corresponding amino substituted sulfonamide compound by conventional methods. In a preferred preparative procedure, a nitro substituted sulfonamide compound is treated with hydrogen in the presence of Raney nickel catalyst at a pressure of from about 1000 to 1500 pounds per square inch and at a temperature of from about 20° to 60° C. to produce an amino substituted sulfonamide compound. The product is recovered and purified, if desired, according to conventional methods.

In the preparation of the sulfonamide compounds which have a hydroxy substituent on the benzimidazole ring, the general process previously described may be employed using an appropriately substituted o-phenylenediamine, or alternate processes in which an amino or alkoxy substituted sulfonamide compound is converted to the corresponding hydroxy compound by (a) diazotization followed by hydrolysis or (b) acid cleavage, respectively. Thus, an amino substituted sulfonamide compound prepared as above described may be diazotized by treating with concentrated sulfuric acid and sodium nitrite at a temperature of from about −10° to 0° C., followed by heating the diazonium salt solution on a water bath to about 50° C. The product is then recovered by conventional procedures. Alternatively, an alkoxy-substituted sulfonamide compound may be heated with constant boiling hydriodic acid for from 2 to 3 hours and thereafter recovering the product by conventional procedures.

The mineral acid salts of the sulfonamide compounds of the present invention may be prepared by heating together a sulfonamide compound with substantially equimolar proportions or excess of mineral acid in water as reaction medium. The product usually precipitates when the reaction mixture is allowed to cool to room temperature and may be recovered by conventional procedures.

The following examples illustrate the present invention but are not to be construed as limiting.

EXAMPLE 1

α-(Benzimidazolyl)-p-Toluenesulfonamide

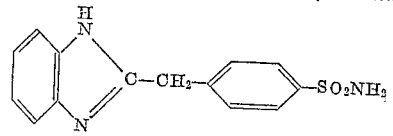

136 grams (1.0 mole) of phenylacetic acid was added portionwise with stirring to 580 grams (5.0 moles) of cold (0° C.) chlorosulfonic acid. The mixture was stirred for ½ hour after completion of the addition and then poured over cracked ice to obtain p-chlorosulfonylphenylacetic acid intermediate product as a white solid. The latter was recovered by filtration.

100 milliliters of ice cold ammonium hydroxide (14.8 normal) was added to the p-chlorosulfonylphenylacetic acid above prepared. The mixture was then heated on a steam bath for a short period, then allowed to cool to room temperature, diluted with 100 milliliters of water and neutralized with 4-normal-hydrochloric acid to obtain p-sulfamoylphenylacetic acid as a white crystalline solid having a melting point of 179°–181° C.

6.0 grams (0.028 mole) of p-sulfamoylphenylacetic acid, 3.0 grams (0.028 mole) of o-phenylenediamine and 30 milliliters of 4-normal hydrochloric acid were mixed together and heated at reflux temperature overnight. After completion of the heating the reaction mixture was filtered to remove insoluble solid material and the filtrate neutralized with ammonium hydroxide to precipitate an α-(2-benzimidazolyl)-p-toluenesulfonamide product. The product was recovered by filtration and then purified by washing with water, dissolving in ethanol, treating the ethanol solution with activated charcoal and recrystallizing from an ethanol-water mixture. The purified product was a crystalline solid melting at 232°–233° C.

EXAMPLE 2

α-(2-Benzimidazolyl)-N,N-Dimethyl-p-Toluene-sulfonamide

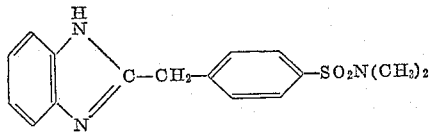

58.0 grams (1.0 mole) of sodium chloride was added portionwise with stirring to 580 grams (5.0 moles) of chilled (5° C.) chlorosulfonic acid while the temperature was maintained between 5° and 10° C. A reaction took place with the formation of the sodium salt of chlorosulfonic acid and hydrogen chloride gas which evolved from the reaction mixture. 136.0 grams (1.0 mole) of phenylacetic acid was added portionwise and with stirring and continued cooling over a period of about 45 minutes to the resulting mixture. Stirring was continued while the reaction mixture was gradually allowed to warm up to room temperature and thereafter the mixture was stirred at room temperature for about 72 hours. The resulting reaction mixture was poured over ice to produce p-chlorosulfonylphenylacetic acid intermediate product as a white solid.

42 grams (0.18 mole) of the intermediate p-chlorosulfonylphenylacetic acid thus prepared was dissolved in 300 milliliters (1.8 mole) of 25 percent aqueous dimethylamine. The resulting mixture was heated on the steam bath to complete the reaction and to drive off any unreacted amine. The mixture was filtered to remove solid impurities, the filtrate then cooled and acidified with hydrochloric acid to precipitate an oily product which soon solidified. The mixture was cooled to about 5° C. to complete the precipitation and solidification of an N,N-dimethyl-p-sulfamoylphenylacetic acid product. The latter was recovered by filtration.

7.0 grams (0.029 mole) of N,N-dimethyl-p-sulfamoylphenylacetic acid, 3.1 grams (0.029 mole) of o-phenylenediamine and 30 milliliters of 4-normal hydrochloric acid were mixed together and heated overnight (about 15 hours) at reflux temperature. The hot reaction mixture was diluted with water, made alkaline with ammonium hydroxide and warmed on a steam bath to obtain an α-(2-benzimidazolyl)-N,N-dimethyl-p-toluenesulfonamide product as a solid. The product was recovered by filtration, washed with water, purified with activated charcoal in dimethylformamide solution and recrystallized from dimethylformamide-water to obtain a purified product melting at 260° C.

EXAMPLE 3 p-(2-(2-Benzimidazolyl)Ethyl)Benzenesulfonamide

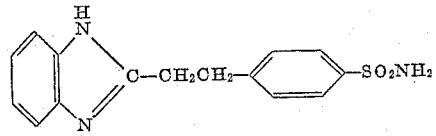

29 grams (0.5 mole) of sodium chloride was added portionwise over a period of 1 hour to 290 grams (2.5 moles) of chlorosulfonic acid while the mixture was maintained at a temperature of from 5° to 10° C. To the resulting mixture was added 70 grams (0.47 mole) of hydrocinnamic acid over a period of 1 hour while the temperature was maintained at about 10° C. The mixture was then allowed to warm slowly to room temperature while stirring and thereafter stirring continued at room temperature for 72 hours. The resulting mixture was poured over ice to precipitate a p-chlorosulfonyl-β-phenylpropionic acid intermediate product. The intermediate product was then recovered by filtration and dried.

44 grams (0.16 mole) of the p-chlorosulfonyl-β-phenylpropionic acid intermediate thus prepared was added to 500 milliliters (7.2 moles) of 14.8 normal ammonium hydroxide while the temperature was maintained at about 10° C. The reaction mixture was gradually allowed to warm to room temperature while stirring and then heated on the steam bath for 2 hours. The resulting mixture was acidified with hydrochloric acid whereupon p-sulfamoyl-β-phenylpropionic acid precipitated in the mixture. The latter was recovered by filtration, washed with water and recrystallized from water. The purified product melted at 168.5°–170.5° C.

6.0 grams (0.026 mole) of p-sulfamoyl-β-phenylpropionic acid, 2.8 grams (0.026 mole) of o-phenylenediamine and 30 milliliters of 4-normal hydrochloric acid were mixed together and heated overnight (about 15 hours) at reflux temperature. The reaction mixture was then diluted with 250 milliliters of water and neutralized with ammonium hydroxide to precipitate a p-(2-(2-benzimidazolyl)ethyl)benzenesulfonamide product as a solid. The latter was purified with activated charcoal in dimethylformamide solution and recrystallized from dimethylformamide-water to produce a purified product as a white crystalline solid melting at 296°–300° C. with decomposition.

EXAMPLE 4 p-(2-(2-Benzimidazolyl)Ethyl)-N,N-Dimethyl-Benezenesulfonamide p-Chlorosulfonyl-β-phenylpropionic acid was prepared as described in Example 3.

44 grams (0.16 mole) of the p-chlorosulfonyl-β-phenylpropionic acid intermediate thus prepared was gradually added to 500 milliliters (2.8 moles) of cold 25 percent aqueous dimethylamine while the mixture was maintained at about 10° C. The mixture was gradually allowed to warm to room temperature while stirring was continued and thereafter heated on the steam bath for 2 hours. After completion of the heating, hydrochloric acid was added in small portions until the reaction mixture was just acid whereupon N,N-dimethyl-p-sulfamoyl-β-phenylpropionic acid precipitated in the reaction mixture. The latter was recovered by filtration and recrystallized from a water-alcohol solution to obtain a purified product melting at 157°–159° C.

7.5 grams (0.029 mole) of N,N-dimethyl-p-sulfamoyl-β-phenylpropionic acid, 3.0 grams (0.028 mole) of o-phenylenediamine and 30 milliliters of 4-normal hydrochloric acid were mixed together and heated at reflux temperature overnight. The reaction mixture was diluted with 250 milliliters of water and neutralized with ammonium hydroxide to precipitate a p-(2-(2-benzimidazolyl)ethyl) - N,N - dimethyl-benzenesulfonamide product as a solid. The product was recovered by filtration and purified with activated charcoal in a dimethylformamide solution and recrystallized from dimethylformamide-water mixture to obtain a purified product melting at 276°–280° C. with decomposition.

EXAMPLE 5

α-(5-Chloro-2-Benzimidazolyl)-p-Toluenesulfonamide

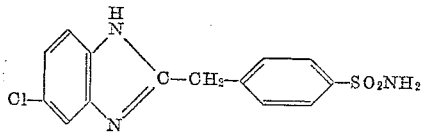

128 grams (0.55 mole) of p-chlorosulfonylphenylacetic acid prepared as described in Example 2 was mixed with 500 milliliters (7.2 moles) of ice cold 14.8 normal ammonium hydroxide and the resulting mixture heated on the steam bath to complete the reaction and to drive off unreacted ammonia. The hot solution was filtered to remove unreacted solids, allowed to cool and then acidified with concentrated hydrochloric acid whereupon a p-sulfamoylphenylacetic acid intermediate product precipitated as a white solid. The latter was recovered by filtration and dried. The p-sulfamoylphenylacetic acid intermediate melted at 176°–178° C.

6.5 grams (0.03 mole) of p-sulfamoylphenylacetic acid, 4.3 grams (0.03 mole) of 4-chloro-o-phenylenediamine and 45 milliliters of 4-normal hydrochloric acid were mixed together and heated at reflux temperature overnight. At the end of this period the mixture was diluted to about 300 milliliters with water and neutralized with ammonium hydroxide and warmed on the steam bath for about 30 minutes to insure complete neutralization. As a result of these operations, an α-(5-chloro-2-benzimidazolyl)-p-toluenesulfonamide product precipitated in the reaction mixture. The product was recovered by filtration and purified with activated charcoal in dimethylformamide solution and recrystallized from dimethylformamide-water mixture. The α-(5-chloro-2-benzimidazolyl)-p-toluenesulfonamide product was a yellow solid melting at 250°–253° C. with decomposition.

EXAMPLE 6

α-(5-Chloro-2-Benzimidazolyl)-N,N-Dimethyl-p-Toluenesulfonamide

N,N-dimethyl-p-sulfamoylphenylacetic acid was prepared as described in Example 2.

7.0 grams (0.029 mole) of N,N-dimethyl-p-sulfamoylphenylacetic acid, 4.0 grams (0.028 mole) of 4-chloro-o-phenylenediamine and 45 milliliters of 4-normal hydrochloric acid were mixed together and heated overnight at reflux temperature. The mixture was then diluted to about 300 milliliters with water, neutralized with about 15 milliliters of ammonium hydroxide and then warmed on the steam bath for about 30 minutes to obtain an α-(5-chloro-2-benzimidazolyl) - N,N - dimethyl-p-toluenesulfonamide product. The product was recovered by filtration, purified with activated charcoal in dimethylformamide solution and recrystallized from dimethylformamide-water mixture to obtained a purified product as a tan solid melting at 170°–175° C.

EXAMPLE 7 p-(2-(5-Chloro-2-Benzimidazolyl)Ethyl)-Benzenesulfonamide p-Sulfamoyl-β-phenylpropionic acid was prepared as described in Example 3.

6.0 grams (0.026 mole) of p-sulfamoyl-β-phenylpropionic acid thus prepared, 3.7 grams (0.026 mole) of 4-chloro-o-phenylenediamine and 45 milliliters of 4-normal hydrochloric acid were mixed together and heated overnight at reflux temperature. The resulting mixture was diluted to about 300 milliliters with water and neutralized with about 15 milliliters of ammonium hydroxide and thereafter warmed on the steam bath for about 30 minutes to obtain a p-(2-(5-chloro-2-benzimidazolyl)ethyl)benzenesulfonamide product. The mixture was then allowed to cool to room temperature, filtered to recover the product and the latter purified with activated charcoal in dimethylformamide solution and recrystallized from dimethylformamide-water mixture to obtain a white crystalline solid melting at 260.5°–262.5° C.

EXAMPLE 8 p-(2-(5-Chloro-2-Benzimidazolyl)Ethyl)-N,N-Dimethylbenzenesulfonamide

In a similar manner, a p-(2-(5-chloro-2-benzimidazolyl)ethyl) - N,N - dimethylbenzenesulfonamide product melting at 160°–162° C. was prepared from N,N-dimethyl-p-sulfamoyl-β-phenylpropionic acid and 4-chloro-o-phenylenediamine in the presence of hydrochloric acid.

EXAMPLE 9

α-(5-Methyl-2-Benzimidazolyl)-p-Toluenesulfonamide

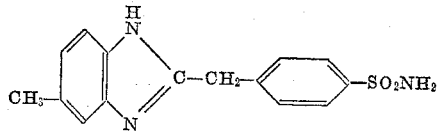

p-Sulfamoylphenylacetic acid was prepared as described in Example 5.

14.92 grams (0.069 mole) of p-sulfamoylphenylacetic acid thus prepared, 13.52 grams (0.069 mole) of 3,4-toluenediamine·dihydrochloride and 70 milliliters of 4-normal hydrochloric acid were mixed together and heated overnight at reflux temperature. The reaction mixture was diluted with 300 milliliters of ammonium hydroxide and heated on the steam bath to complete the reaction to produce an α-(5-methyl-2-benzimidazolyl)-p-toluenesulfonamide product. The product, after purification with activated charcoal and recrystallization successively from dimethylformamide-water and ethanol-water mixtures, melted at 218°–221° C. and was a yellow crystalline solid.

EXAMPLE 10 p-(2-(5-Methyl-2-Benzimidazolyl)Ethyl)-Benzenesulfonamide

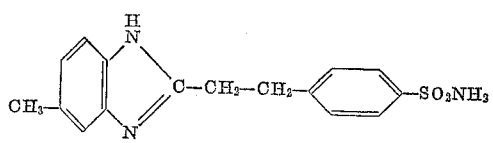

p-Sulfamoyl-β-phenylpropionic acid was prepared as described in Example 3.

6.64 grams (0.029 mole) of p-sulfamoyl-β-phenylpropionic acid thus prepared, 5.68 grams (0.029 mole) of 3,4-toluenediamine·dihydrochloride and 40 milliliters of 4-normal hydrochloric acid were mixed together and heated at reflux temperature overnight. The reaction mixture was then diluted with 300 milliliters of ammonium hydroxide and heated on the steam bath to complete the reaction to produce a p-(2-(5-methyl-2-benzimidazolyl)ethyl)benzenesulfonamide product. The latter, after purification with activated charcoal and recrystallization from dimethylformamide, was a pale tan crystalline solid melting at 278°–281° C.

EXAMPLE 11

*α-(5-Methoxy-2-Benzimidazolyl)-p-Toluenesulfonamide*

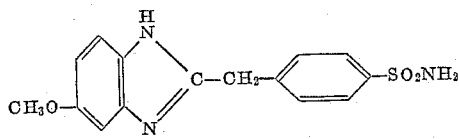

32.3 grams (0.15 mole) of p-sulfamoylphenylacetic acid prepared in a manner similar to that described previously, 21 grams (0.1 mole) of 4-methoxy-o-phenylenediamine·dihydrochloride and 60 milliliters of 4-normal hydrochloric acid were mixed together and heated overnight at reflux temperature. The resulting mixture was diluted with water to about 400 milliliters and then made slightly alkaline with ammonium hydroxide. A small amount of solid was present in the reaction mixture after the above treatment. The mixture was then treated with dilute alkali, filtered to remove still remaining solid and the filtrate neutralized with a small amount of glacial acetic acid to precipitate an α-(5-methoxy-2-benzimidazolyl)-p-toluenesulfonamide product. The latter was recovered by filtration, purified with activated charcoal in 95 percent ethanol, and recrystallized from ethanol-water to obtain a purified product melting at 218°–221° C.

EXAMPLE 12

*α-(5-Ethoxy-2-Benzimidazolyl)-p-Toluenesulfonamide*

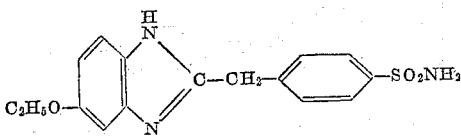

In a similar manner, an α-(5-ethoxy-2-benzimidazolyl)-p-toluenesulfonamide product having a molecular weight of 331 was prepared from 10 grams (0.0465 mole) of p-sulfamoylphenyl-acetic acid, 10 grams (0.0445 mole) of 4-ethoxy-o-phenylenediamine·dihydrochloride and 45 milliliters of 4-normal hydrochloric acid.

EXAMPLE 13

*α-(2-Benzimidazolyl)-N-Cyclohexyl-p-Toluenesulfonamide*

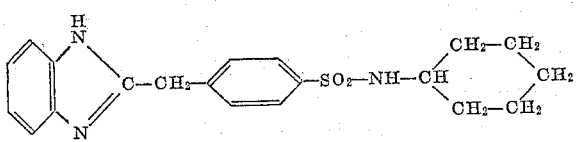

A solution of 51.5 grams (0.52 mole) of cyclohexylamine in 150 milliliters of dry ether was added portionwise with stirring to 30 grams (0.128 mole) of p-chlorosulfonylphenylacetic acid prepared in a manner similar to that described previously. The resulting mixture was heated for 2 hours at reflux temperature to obtain a cyclohexylamine salt of N-cyclohexyl-p-sulfamoylphenylacetic acid which precipitated in the reaction mixture. The salt was recovered by filtration, dissolved in 400 milliliters of water and the resulting solution acidified with hydrochloric acid to obtain an N-cyclohexyl-p-sulfamoylphenylacetic acid intermediate product as a semi-solid material. The latter was allowed to stand for about a week in contact with the mother-liquor and thereafter extracted with ether. The ether solution was extracted with 1 normal sodium hydroxide, acidified with hydrochloric acid to precipitate a purified product as a solid. The latter was recovered by filtration, washed and dried.

7.5 grams (0.025 mole) of N-cyclohexyl-p-sulfamoylphenylacetic acid thus prepared, 2.2 grams (0.020 mole) of o-phenylenediamine and 50 milliliters of 4-normal hydrochloric acid were mixed together and heated overnight at reflux temperature. The reaction mixture was diluted with water to 300 milliliters, neutralized with ammonium hydroxide and warmed on the steam bath for 2 hours to obtain an α-(2-benzimidizolyl)-N-cyclohexyl-p-toluenesulfonamide product. The product was purified by treating with activated charcoal in 95 percent ethyl alcohol and recrystallized from ethanol-water to obtain a purified product melting at 90° C. with decomposition.

EXAMPLE 14

*2-(p-(Piperidinosulfonyl)Benzyl)Benzimidazole*

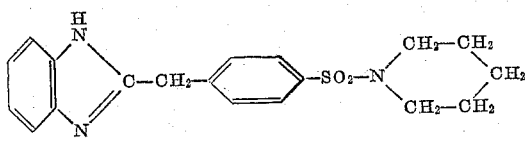

In a manner similar to that previously described, p-(piperidinosulfonyl)phenylacetic acid was prepared from 30 grams (0.128 mole) of p-chlorosulfonylphenylacetic acid and 44.5 grams (0.52 mole) of piperidine.

11.0 grams (0.039 mole) of p-(piperidinosulfonyl)-phenylacetic acid thus prepared, 3.3 grams (0.033 mole) of o-phenylenediamine and 50 milliliters of 4-normal hydrochloric acid were mixed together and heated overnight at reflux temperature. The resulting mixture was diluted to 300 milliliters with water, neutralized with ammonium hydroxide and heated on the steam bath for 2 hours to obtain a 2-(p-(piperidinosulfonyl)benzyl)benzimidazole product. The product was recovered by filtration, treated with activated charcoal in 95 percent ethyl alcohol and recrystallized from ethanol-water mixture to obtain a purified product melting at 93°–95° C. with decomposition.

EXAMPLE 15

*2-(p-Sulfamoylbenzyl)-5-Benzimidazolecarboxylic Acid*

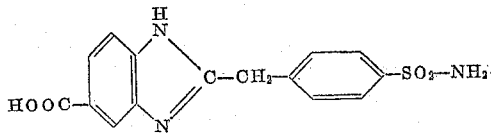

p-Sulfamoylphenylacetic acid was prepared in a manner similar to that described in Example 5.

18 grams (0.084 mole) of p-sulfamoylphenylacetic acid, 10 grams (0.066 mole) of 3,4-diaminobenzoic acid and 80 milliliters of 4-normal hydrochloric acid were mixed together and heated overnight at reflux temperature. After completion of the heating, the mixture was diluted to 300 milliliters with water, cooled to room temperature and concentrated ammonium hydroxide added thereto until the mixture had a pH of 4.5. The mixture was then cooled in an ice bath to precipitate a 2-(p-sulfamoylbenzyl)-5-benzimidazolecarboxylic acid product. The latter was recovered by filtration, purified with activated charcoal and recrystallized from ethanol-dimethylformamide-water mixture to obtain a purified compound melting from 290° to 295° C.

EXAMPLE 16

*Methyl-2-(p-Sulfamoylbenzyl)-5-Benzimidazolecarboxylate*

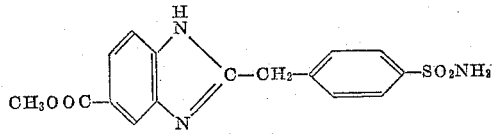

Methyl 2-(p-sulfamoylbenzyl) - 5 - benzimidazolecarboxylate having a molecular weight of 345.3 is prepared by dissolving 2-(p-sulfamoylbenzyl)-5-benzimidazolecarboxylic acid prepared as described in Example 15, in molar excess of methanol, passing into the resulting solution anhydrous hydrogen chloride while the mixture is heated at reflux temperature whereupon the desired product precipitates in the reaction mixture. The product is recovered by filtration and recrystallized from methanol-water to obtain a purified product.

EXAMPLE 17

*Ethyl-2-(p-Sulfamoylbenzyl)-5-Benzimidazolecarboxylate*

In a manner similar to that described in Example 16, ethyl 2-(p-sulfamoylbenzyl)-5-benzimidazolecarboxylate having a molecular weight of 359.3 is prepared from 2-(p-sulfamoylbenzyl)-5-benzimidazolecarboxylic acid and ethanol in the presence of anhydrous hydrogen chloride and zinc chloride.

EXAMPLE 18

*2-(p-Sulfamoylbenzyl)-5-Benzimidazolecarboxamide*

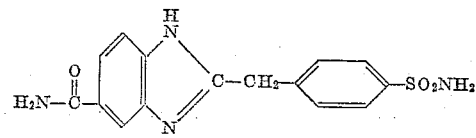

2-(p-sulfamoylbenzyl) - 5 - benzimidazolecarboxamide having a molecular weight of 330.3 is prepared by heating ethyl 2 - (p - sulfamoylbenzyl)-5-benzimidazolecarboxylate, prepared as set forth in Example 17, with aqueous ammonium hydroxide solution under autonomous pressure at 100° C. for several hours.

EXAMPLE 19

*Potassium 2-(p-Sulfamoylbenzyl)-5-Benzimidazolecarboxylate*

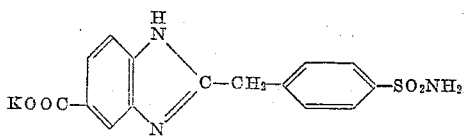

Potassium 2-(p-sulfamoylbenzyl)-5-benzimidazolecarboxylate having a molecular weight of 369.4 is prepared by reacting approximately one molar proportion of 2-(p-sulfamoylbenzyl)-5-benzimidazolecarboxylic acid with approximately one molar proportion of potassium hydroxide in aqueous ethanol and evaporation of the resulting reaction mixture to dryness.

EXAMPLE 20

*α-(5-Nitro-2-Benzimidazolyl)-p-Toluenesulfonamide*

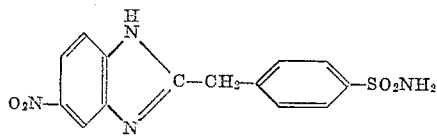

p-Sulfamoylphenylacetic acid was prepared in a manner similar to that described in Example 5.

86 grams (0.40 mole) of p-sulfamoylphenylacetic acid, 50 grams (0.326 mole) of 4-nitro-o-phenylenediamine, and 400 milliliters of 4-normal hydrochloric acid were mixed together and heated under reflux temperature overnight. The reaction mixture was cooled to room temperature, diluted to 800 milliliters with distilled water and made slightly alkaline with concentrated ammonium hydroxide to precipitate an α-(5-nitro-2-benzimidazolyl)-p-toluenesulfonamide product. The latter was purified by treatment with activated charcoal and repeated recrystallization from dimethylformamide-water and ethanol-water to obtain a purified product melting at 253°–256° C.

EXAMPLE 21

*α-(5-Amino-2-Benzimidazolyl)-p-Toluenesulfonamide*

α-(5-amino-2-benzimidazolyl) - p - toluenesulfonamide having a molecular weight of 302.3 was prepared by treating 10 grams (0.03 mole) of α-(5-nitro-2-benzimidazolyl)-p-toluenesulfonamide prepared as described in Example 20 with hydrogen at 1000 pounds pressure and 20° to 60° C. in the presence of 4 grams of Raney nickel catalyst and 150 milliliters of absolute methanol.

EXAMPLE 22

*α-(5-Hydroxy-2-Benzimidazolyl)-p-Toluenesulfonamide*

α-(5-hydroxy-2-benzimidazolyl) - p-toluenesulfonamide having a molecular weight of 303.3 is prepared by dispersing α-(5-amino-2-benzimidazolyl)-p - toluenesulfonamide prepared as above set forth in aqueous sulfuric acid, adding sodium nitrite solution and heating the intermediate diazonium salt solution.

EXAMPLE 23

*α-(2-Benzimidazolyl)-o-Xylenesulfonamide*

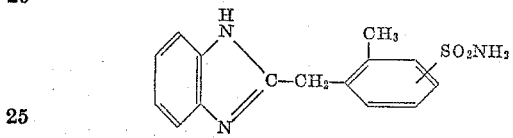

A chlorosulfonyl-2-methylphenylacetic acid is prepared by the reaction of 1 molar proportion of 2-methylphenylacetic acid with about 6.5 molar proportion of chlorosulfonic acid in the presence of 1 molar proportion of sulfur trioxide at from —10° to 25° C. over 48 hours.

Sulfamoyl-2-methylphenylacetic acid is prepared from the chlorosulfonyl-2-methylphenylacetic acid thus prepared and ammonium hydroxide in a matter similar to that described in Example 3.

23 grams (0.1 mole) of a sulfamoyl-2-methylphenylacetic acid, 10.8 grams (0.1 mole) of o-phenylenediamine and 120 milliliters of 4-normal hydrochloric acid are heated together for 24 hours at reflux temperature to obtain the hydrochloride salt of an α-(2-benzimidazolyl)-o-xylenesulfonamide product. The latter is recovered by filtration, suspended in water and treated with ammonium hydroxide to obtain an α-(2-benzimidazolyl)-o-xylenesulfonamide product. The product after recrystallization from ethanol has a melting point of 259°–260° C.

EXAMPLE 24

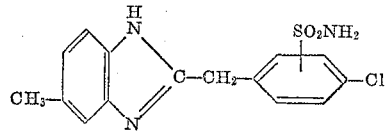

A chlorosulfonyl-4-chlorophenylacetic acid having the formula

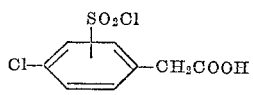

is prepared from chlorosulfonic acid and 4-chlorophenylacetic acid in the presence of sulfur trioxide in a manner similar to that described in Example 23.

A corresponding sulfamoyl-4-chlorophenylacetic acid is prepared from the chlorosulfonyl-4-chlorophenylacetic acid, prepared as above described, and ammonium hydroxide in a manner similar to that described in Example 3.

In a manner similar to that previously described, the sulfamoyl-4-chlorophenylacetic acid, prepared as above set forth, and 3,4-diaminotoluene are heated together at reflux temperature in dilute hydrochloric acid to produce an α-(5-methyl-2-benzimidazolyl)-4-chlorotoluenesulfonamide product having a molecular weight of 335.8.

EXAMPLE 25

*p-(1-(2-Benzimidazolyl)Propyl)Benzenesulfonamide*

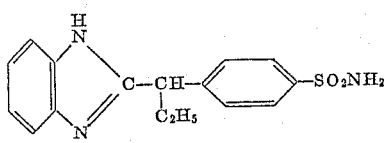

α-(p-sulfamoylphenyl)butyric acid is prepared in a manner similar to that previously described by the reaction of chlorosulfonic acid on α-phenylbutyric acid to produce α-(p-chlorosulfonylphenyl)butyric acid followed by the reaction of the latter with ammonium hydroxide to produce α-(p-sulfamoylphenyl)butyric acid.

α-(p-sulfamoylphenyl)butyric acid prepared as above, set forth and o-phenylenediamine are heated together at reflux temperature in dilute hydrochloric acid to obtain a p-(1-(2-benzimidazolyl)propyl)benzenesulfonamide product having a molecular weight of 311.

EXAMPLE 26

In preparations carried out in a manner similar to that described in Example 5, the following p-toluenesulfonamides are prepared:

α-(5-ethyl-2-benzimidazolyl)-p-toluenesulfonamide having a molecular weight of 315.4 by the reaction of 4-ethyl-o-phenylenediamine and p-sulfamoylphenylacetic acid.

α-(4-methyl-2-benzimidazolyl) - p - toluenesulfonamide having a molecular weight of 301.4 by the reaction of 3-methyl-o-phenylenediamine and p-sulfamoylphenylacetic acid.

α-(4,6-dimethyl-2 - benzimidazolyl) - p - toluenesulfonamide having a molecular weight of 315.4 by the retaction of 3,5 - dimethyl - o - phenylenediamine and p-sulfamoyl-phenylacetic acid.

α-(5-tertiary-butyl-2-benzimidazolyl) - p - tolenesulfonamide having a molecular weight of 343.4 by the reaction of 4-tertiary-butyl-o-phenylenediamine and p-sulfamoyl-phenylacetic acid.

α-(5,6-dimethyl-2-benzimidazolyl) - p - toluenesulfonamide having a molecular weight of 315.4 by the reaction of 4,5 - dimethyl - o - phenylenediamine and p-sulfamoyl-phenylacetic acid.

α-(5-chloro-6-methyl - 2 - benzimidazolyl) - p - toluenesulfonamide having a molecular weight of 336 by the reaction of 4-chloro-5-methyl-o-phenylenediamine and p-sulfamoylphenylacetic acid.

α-(4-bromo - 6 - methyl - benzimidazolyl) - p - toluenesulfonamide having a molecular weight of 381.4 by the reaction of 3-bromo-5-methyl-o-phenylenediamine and p-sulfamoylphenylacetic acid.

EXAMPLE 27

In preparations carried out in a manner similar to that previously described, the following sulfonamides are prepared:

p-(2-(4,7-dimethyl-2-benzimidazolyl)ethyl) - N,N - diethylbenzenesulfonamide having a molecular weight of 385.4 by the reaction of 3,6-dimethyl-o-phenylenediamine and 4-(N,N-diethylsulfamoyl)-β-phenylpropionic acid.

α-(5-chloro-6-methyl-2-benzimidazolyl) - N - isopropyl-p-toluenesulfonamide having a molecular weight of 378 by the reaction of 4-chloro-5-methyl-o-phenylenediamine and 4-(N-isopropylsulfamoyl)phenylacetic acid.

p - (2 - (5-normal-butyl - 2 - benzimidazolyl)ethyl)-N-secondary-butyl benzenesulfonamide having a molecular weight of 413.4 by the reaction of 4-normal-butyl-o-phenylenediamine and 4-(N-secondary-butyl-sulfamoyl)-β-phenylpropionic acid.

p-(2(2-benzimidazolyl)ethyl) - N,N - diisopropylbenzenesulfonamide having a molecular weight of 385.4 by the reaction of o-phenylenediamine and 4-(N,N-diisopropylsulfamoyl)-β-phenylpropionic acid.

α²-(2-benzimidazolyl)-2,5-xylenesulfonamide having a molecular weight of 301.3 by the reaction of o-phenylenediamine and 2-sulfamoyl-4-methylphenylacetic acid.

α-(5-bromo-2-benzimidazolyl) - p - toluenesulfonamide having a molecular weight of 3.66.3 by the reaction of 4-bromo-o-phenylenediamine and p-sulfamoylphenylacetic acid.

EXAMPLE 28

*α¹-(5-Methyl-2-Benzimidazolyl)-5-Pseudocumenesulfonamide*

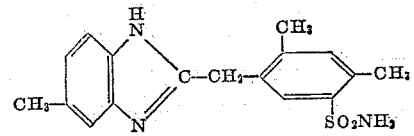

5-chlorosulfonyl-2,4-dimethylphenylacetic acid is prepared from chlorosulfonic acid and 2,4-dimethylphenylacetic acid in a manner similar to that described in Example 23.

2,4-dimethyl-5-sulfamoylphenylacetic acid is prepared from 5-chlorosulfonyl-2,4-dimethylphenylacetic acid and ammonium hydroxide in a manner similar to that described in Example 3.

48.6 grams (0.2 mole) of 2,4-dimethyl-5-sulfamoylphenylacetic acid, 24.4 grams (0.2 mole) of 3,4-diaminotoluene and 200 milliliters of 4-normal hydrochloric acid are heated together for about 15 hours at reflux temperature. After completion of the heating, the mixture is diluted to about 800 milliliters with water and thereafter neutralized with ammonium hydroxide to obtain an α¹-(5-methyl-2-benzimidazolyl) - 5 - pseudocumenesulfonamide product having a molecular weight of 329.

EXAMPLE 29

*α-(5-Methyl-2-Benzimidazolyl)-p-Xylenesulfonamide*

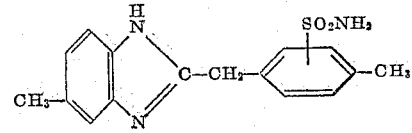

A chlorosulfonyl-4-methylphenylacetic acid was prepared from chlorosulfonic acid and 4-methylphenylacetic acid in a manner similar to that described in Example 23.

A sulfamoyl-4-methylphenylacetic acid was prepared from the chlorosulfonyl-4-methylphenylacetic acid above prepared and ammonium hydroxide in a manner similar to that described in Example 3.

11.5 grams (0.05 mole) of sulfamoyl-4-methylphenylacetic acid, 10 grams (0.5 mole) of 3,4-diaminotoluene·dihydrochloride and 100 milliliters of 4-normal hydrochloric acid were heated together about 40 hours at reflux temperature to obtain a hydrochloride salt of an α-(5-methyl-2-benzimidazolyl)-p-xylenesulfonamide product. The latter was recovered by filtration and neutralized with ammonium hydroxide to obtain an α-(5-methyl-2-benzimidazolyl) - p - xylenesulfonamide product. The product after recrystallization from ethanol melted at 131°–132° C. with decomposition.

EXAMPLE 30

*α²-(2-Benzimidazolyl)-4-Bromo-2,5-Xylenesulfonamide*

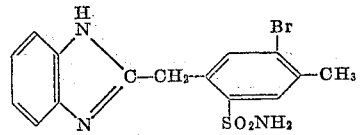

3-bromo-4-methyl-6-chlorosulfonylphenylacetic acid is prepared from chlorosulfonic acid and 3-bromo-4-methylphenylacetic acid in a manner similar to that described in Example 23.

3-bromo-4-methyl-6-sulfamoylphenylacetic acid is prepared from 3-bromo-4-methyl-6-chlorosulfonylphenylacetic acid and ammonium hydroxide in a manner similar to that described in Example 3.

61.6 grams (0.2 mole) of 3-bromo-4-methyl-6-sulfamoylphenylacetic acid, 21.6 grams (0.2 mole) of o-phenylenediamine and 300 milliliters of 4-normal hydrochloric acid are heated together about 15 hours at reflux temperature. After completion of the heating, the mixture is diluted to about 800 milliliters with water and thereafter neutralized with ammonium hydroxide to obtain an $\alpha^2$-(2-benzimidazolyl)-4-bromo-2,5-xylenesulfonamide product having a molecular weight of 380.3.

EXAMPLE 31

$\alpha$-(2-Benzimidazolyl)-4,6 - Dichloro - m - Toluenesulfonamide and $\alpha$-(2-Benzimidazolyl)-3,5-Dichloro-o-Toluenesulfonamide

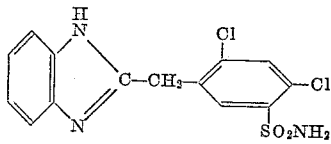

and

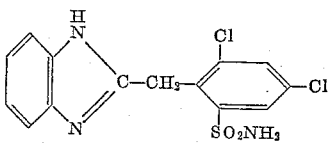

2,4-dichlorophenylacetic acid and chlorosulfonic acid are reacted together in a manner similar to that described in Example 23 to produce a mixture of 2,4-dichloro-5-chlorosulfonylphenylacetic acid and 2,4-dichloro-6-chlorosulfonylphenylacetic acid.

The mixtures, 2,4-dichloro-5-chlorosulfonylphenylacetic acid and 2,4-dichloro - 6 - chlorosulfonylphenylacetic acid thus obtained are reacted with ammonium hydroxide in a manner similar to that described in Example 3 to produce a mixture of 2,4-dichloro-5-sulfamoylphenylacetic acid and 2,4-dichloro-6-sulfamoylphenylacetic acid.

In a manner similar to that previously described, the mixture of 2,4-dichloro-5-sulfamoylphenylacetic acid and 2,4-dichloro-6-sulfamoylphenylacetic acid and o-phenylene diamine are heated together at reflux temperature in dilute hydrochloric acid to produce a mixture of $\alpha$-(2-benzimidazolyl)-4,6-dichloro-m-toluenesulfonamide and $\alpha$-(2-benzimidazolyl)-3,5-dichloro-o - toluenesulfonamide products having a molecular weight of 355.

EXAMPLE 32

$\alpha$-(2-Benzimidazolyl)-p-Toluenesulfonamide Phosphoric Acid Salt

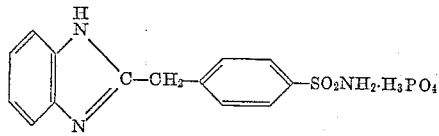

10 grams (0.034 mole) of $\alpha$-(2-benzimidazolyl)-p-toluenesulfonamide, 4 grams (0.048 mole) of 85 percent phosphoric acid and 75 milliliters of water were heated together to boiling, and the hot mixture then filtered to remove insoluble impurities and the filtrate cooled at precipitate an $\alpha$-(2-benzimidazolyl)-p-toluenesulfonamide phosphoric acid salt product having a molecular weight of 385.3.

EXAMPLE 33

$\alpha$-(5-Methyl-2-Benzimidazolyl)-3-Chloro-p-Toluenesulfonamide

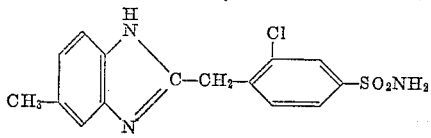

2-chloro-4-chlorosulfonylphenylacetic acid is prepared from chlorosulfonic acid and 2-chlorophenylacetic acid in a manner similar to that described in Example 23.

2-chloro-4-sulfamoylphenylacetic acid is prepared from 2-chloro-4-chlorosulfonylphenylacetic acid, prepared as above described, and ammonium hydroxide in a manner similar to that described in Example 3.

In a manner similar to that previously described, 2-chloro-4-sulfamoylphenylacetic acid, prepared as above set forth, and 3,4-diaminotoluene are heated together at reflux temperature in dilute hydrochloric acid to produce an $\alpha$-(5-methyl-2-benzimidazolyl)-3-chloro-p-toluenesulfonamide product having a molecular weight of 335.8.

EXAMPLE 34

$\alpha$-(5-Methyl-2-Benzimidazolyl)-2-Chloro-p-Toluenesulfonamide

In a preparation carried out in a manner similar to that described in Example 33, $\alpha$-(5-methyl-2-benzimidazolyl)-2-chloro-p-toluenesulfonamide having a molecular weight of 335.8 is prepared by the reaction of 3,4-diaminotoluene and 3-chloro-4-sulfamoylphenylacetic acid.

EXAMPLE 35

$\alpha$-(2-Chloro-5-Benzimidazolyl)-N-Methyl-p Toluenesulfonamide

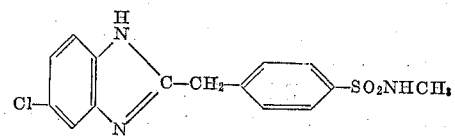

p-Chlorosulfonylphenylacetic acid is prepared as described in Example 2.

N-methyl-p-sulfamoylphenylacetic acid is prepared from p-chlorosulfonylphenylacetic acid and methylamine in a manner similar to that described in Example 2.

6.9 grams (0.03 mole) of N-methyl-p-sulfamoylphenylacetic acid, 4.3 grams (0.03 mole) of 4-chloro-o-phenylenediamine and 45 milliliters of 4-normal hydrochloric acid are mixed together and heated for about 15 hours at reflux temperature. After completion of the heating, the mixture is diluted to about 300 milliliters with water and thereafter neutralized with ammonium hydroxide to obtain an $\alpha$-(5-chloro-2-benzimidazolyl) - N - methyl-p-toluenesulfonamide product having a molecular weight of 335.8.

EXAMPLE 36

In preparations carried out in a manner similar to that previously described, the following sulfonamides are prepared:

$\alpha$-(5,6-dimethyl-2-benzimidazolyl)-4,5-dichloro-o - toluenesulfonamide by the reaction of 4,5-dimethyl-o-phenylenediamine and 4,5-dichloro - 2 - sulfamoyl - phenylacetic acid.

4-[3-(4,7-dibromo-2 - benzimidazolyl)propyl] - 2,5-dimethylbenzenesulfonamide by the reaction of 3,6-dibromo-o-phenylenediamine and 4-(2,5-dimethyl - 4 - sulfamoylphenyl)butyric acid.

$\alpha^5$-(5,6-dichloro-2-benzimidazolyl)-4-chloro-2,5-xylenesulfonamide by the reaction of 4,5-dichloro-o-phenylenediamine and 2-chloro-4-methyl-5 - sulfamoylphenylacetic acid.

$\alpha^4$-(4-normal-butoxy-2-benzimidazolyl)-5 - chloro - 2,4-xylenesulfonamide by the reaction of 4-normal-butoxy-o-phenylenediamine and 2-chloro-5-methyl - 4 - sulfamoylphenylacetic acid.

4-[3-(5,6-diethyl-2-benzimidazolyl)propyl]-2,5 - dichlorobenzenesulfonamide by the reaction of 4,5-diethyl-o-phenylenediamine and 4-(2,5-dichloro - 4 - sulfamoyl)butyric acid.

2-(2-bromo-5-methyl-4-sulfamoylbenzyl)-4,7 - dimethyl-5-benzimidazolecarboxylic acid by the reaction of 3,4-diamino-2,5-dimethylbenzoic acid and 2-bromo-5-methyl-4-sulfamoylphenylacetic acid.

α-(4,7-dimethyl-5-nitrobenzimidazolyl) - p - toluenesulfonamide by the reaction of 3,6-dimethyl-4-nitro-o-phenylenediamine and 4-sulfamoylphenylacetic acid.

α²-(2-benzimidazolyl)-5 - chloro - 6 - pseudocumenesulfonamide by the reaction of o-phenylenediamine and 4-chloro-2,5-dimethyl-3-sulfamoylphenylacetic acid.

EXAMPLE 37

In operations carried out in a manner similar to that described in Example 19, the following compounds are prepared:

Sodium 2-(p-sulfamoylbenzyl)-5-benzimidazolecarboxylate by the reaction of 2-(p-sulfamoylbenzyl)-5-benzimidazolecarboxylic acid and sodium hydroxide.

Trimethylammonium 2-(p-sulfamoylbenzyl)-5-benzimidazolecarboxylate by the reaction of 2-(p-sulfamoylbenzyl)-5-benzimidazolecarboxylic acid and trimethylamine.

Ammonium 2 - (p-sulfamoylbenzyl)-5-benzimidazolecarboxylate by the reaction of 2-(p-sulfamoylbenzyl)-5-benzimidazolecarboxylic acid and ammonium hydroxide.

Bis(2-hydroxyethyl)ammonium 2-(p-sulfamoylbenzyl)-5-benzimidazolecarboxylate by the reaction of 2-(p-sulfamoylbenzyl)-5-benzimidazolecarboxylic acid and bis(2-hydroxyethyl)amine.

Tri-normal-propyl)ammonium 2-(p-sulfamoylbenzyl)-5-benzimidazolecarboxylate by the reaction of 2-(p-sulfamoylbenzyl)-5-benzimidazolecarboxylic acid and tri(normal-propyl)amine.

EXAMPLE 38

In preparations carried out in a manner similar to that described in Example 32, the following compounds are prepared:

p-(2-(2-benzimidazolyl)ethyl)benzenesulfonamide hydrochloride by the reaction of p-(2-(2-benzimidazolyl)ethyl)benzenesulfonamide and concentrated hydrochloric acid.

α - (5 - chloro-2-benzimidazolyl)-p-toluenesulfonamide hydrobromide by the reaction of α-(5-chloro-2-benzimidazolyl)-p-toluenesulfonamide and concentrated hydrobromic acid.

p - (2 - (5 - chloro - 2 - benzimidazolyl)ethyl)benzenesulfonamide phosphoric acid salt by the reaction of p-(2 - (5 - chloro - 2 - benzimidazolyl)ethyl)benzenesulfonamide and phosphoric acid.

EXAMPLE 39

In preparations carried out in a manner similar to that described in Examples 15, 16 and 17, the following compounds are prepared:

2 - (4 - (N - butyl - N - methylsulfamoyl)phenethyl)-5-benzimidazolecarboxylic acid by the reaction of 3-(4-(N-butyl-N-methylsulfamoyl)phenyl)propionic acid and 3,4-diaminobenzoic acid.

Isopropyl 2 - (4 - (N - butyl-N-methylsulfamoyl)phenethyl)-5-benzimidazolecarboxylate by heating together at reflux temperature, 2-(4-(N-butyl-N-methylsulfamoyl)phenethyl)-5-benzimidazolecarboxylic acid and isopropyl alcohol in the presence of anhydrous hydrogen chloride.

2 - (4 - (N - butyl - N - methylsulfamoyl)phenethyl)-5-benzimidazolecarboxamide by heating under autonomous pressure isopropyl 2 - (4 - (N-butyl-N-methylsulfamoyl)phenethyl)-5-benzimidazolecarboxylate and aqueous ammonium hydroxide.

EXAMPLE 40

In similar preparations, the following compounds are prepared:

2 - (2-chloro-5-methyl-4-sulfamoylbenzyl)-5-benzimidazolecarboxylic acid by the reaction of 2-chloro-3-methyl-4-sulfamoylphenylacetic acid and 3,4-diaminobenzoic acid.

Isobutyl 2 - (2 - chloro-5-methyl-4-sulfamoylbenzyl)-5-benzimidazolecarboxylate by the reaction of isobutyl alcohol and 2-(2-chloro-5-methyl-4-sulfamoylbenzyl)-5-benzimidazolecarboxylic acid in the presence of anhydrous hydrogen chloride.

2 - (2 - chloro-5-methyl-4-sulfamoylbenzyl)-5-benzimidazolecarboxamide by the reaction of isobutyl 2-(2-chloro - 5 - methyl - 4-sulfamoylbenzyl)-5-benzimidazolecarboxylate and ammonium hydroxide.

EXAMPLE 41

In preparations carried out in a manner similar to that described in Examples 20, 21 and 22, the following compounds are prepared:

α⁵-(5-nitro-2-benzimidazolyl)-2,5-xylenesulfonamide by the reaction of 4-methylphenylacetic acid and 4-nitro-o-phenylenediamine.

α⁵ - (5-amino-2-benzimidazolyl)-2,5-xylenesulfonamide by the reduction of α⁵-(5-nitro-2-benzimidazolyl)-2,5-xylenesulfonamide with hydrogen in the presence of Raney nickel catalyst.

α⁵-(5-hydroxy-2-benzimidazolyl)-2,5-xylenesulfonamide by the diazotization and hydrolysis of α⁵-(5-amino-2-benzimidazolyl)-2,5-xylenesulfonamide.

Many of the compounds of the present invention are useful to antagonize the effects of the cardiovascular hormones of the posterior pituitary gland but not those of the adrenal medulla. Thus, products are effective antagonists of the pressor effects of vasopressin while they exert no effect on the pressor action of epinephrine and nor-epinephrine. They may be employed to explore the vascular effects of various hormones and drugs. It has been found that the action of many of the compounds is exerted upon the vasomotor control centers of the central nervous system to produce a reflex vasodilation of the peripheral vascular system in the face of elevation of systemic blood pressure by such hormones. For example, very small amounts of α-(2-benzimidazolyl)-p-toluenesulfonamide have been found to prevent the pressor action of vasopressin while that of nor-epinephrine was unaffected in the dog.

Others of the compounds have been found to be of outstanding value for the production of diuresis in laboratory animals such as the rat or dog. Such effects may be useful to explore the mechanisms of urine formation and the relative role of electrolytes in the homeostasis of the organism. For example, very small amounts of α-(5-methyl-2-benzimidazolyl)-p-toluenesulfonamide have been found to produce water depletion in laboratory rats and dogs.

The products of the present invention are also useful as flotation agents, as antioxidants, and as corrosion inhibitors in brake fluids.

The sulfonamide compounds of the present invention having the structure

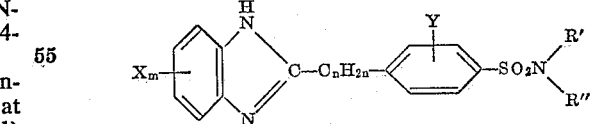

wherein X, Y, R', R", m and n are as previously set forth, are particularly useful as flotation agents in the froth flotation process of concentrating finely ground ores. In representative operations of its use as a flotation agent, a sulfonamide is added to a 500 gram ore sample consisting mainly of chalcocite at a rate of 0.1 pound per ton of ore and mixed with about 300 milliliters of water in a ballmill. The resulting pulp is washed into a flotation cell containing water. The amount of water is sufficient to give a final concentration of about 20 percent solids. Dowfroth 250 (a polypropylene glycol monomethyl ether having an average molecular weight of 250), a commercially available frothing agent, is added to the resulting mixture at a rate of about 0.1 pound per ton of ore. The mixture is agitated in the flotation machine whereupon the chalcocite floats to the surface with the froth and is recovered.

The sulfonamide compounds of the present invention are also useful as antioxidants. For example, they are useful for inhibiting the oxidation of polyethylene glycols which suffer weight loss as a result of exposure to air and heat. As a representative operation for such use, α-(2-benzimidazolyl)-p-toluenesulfonamide was added to Polyglycol E-400 (a polyethylene glycol having an average molecular weight of 400; a product of The Dow Chemical Company) and to Polyglycol E-600 (a polyethylene glycol having an average molecular weight of 600; a product of The Dow Chemical Company) in an amount of 0.5 percent by weight and the resulting modified polyethylene glycols placed in a forced draft vented oven at 150° C. for a period of 3 and 24 hours and the weight loss determined. As a check operation, unmodified polyethyleneglycols were subjected to the same treatment. The results obtained were as follows:

| | Percent weight loss | |
|---|---|---|
| | 3 hours | 5 hours |
| Polyglycol E-400 + α-(2-benzimidazolyl)-p-toluene-sulfonamide | 2.7 | 17.3 |
| Polyglycol E-400 (Check) | 3.5 | 24.5 |
| Polyglycol E-600 + α-(2-benzimidazolyl)-p-toluene-sulfonamide | 1.7 | 16.1 |
| Polyglycol E-600 (Check) | 2.4 | 24.2 |

The products of this invention are also useful as corrosion inhibitors. An application of such use is in brake fluid. In a representative operation for such use, a brake fluid having the following composition:

Percent by weight
Polyglycol P-1200 [1] _____ 20
Diethylene glycol _____ 15
Dowanol DE [2] _____ 65

[1] Polyglycol P-1200—a polypropylene glycol having an average molecular weight of 1200; a product of The Dow Chemical Company.
[2] Dowanol DE—diethylene glycol ethyl ether; a product of The Dow Chemical Company.

was modified by adding 0.5 percent by weight of α-(2-benzimidazolyl)-p-toluenesulfonamide. The extent of corrosion of steel and cast iron strips in the modified as well as unmodified (check) brake fluid was determined following a procedure substantially as described on page 4, "section 8.8, Corrosion," in the publication of The Society of Automotive Engineers, Inc., entitled "SAE Hydraulic Brake Fluid, TR-203." The results obtained were as follows:

| | Weight loss in milligrams per square centimeter | |
|---|---|---|
| | Steel | Cast iron |
| Brake fluid composition modified with α-(2-benzimidazolyl)-p-toluene sulfonamide | 0.000 | 0.050 |
| Unmodified brake fluid composition | 0.315 | 0.805 |

Further, the surfaces of the cast iron and steel strips immersed in the unmodified brake fluid composition were badly stained whereas the surfaces of similar strips immersed in the brake fluid composition modified with α-(2 - benzimidazolyl) - p - toluenesulfonamide were not stained.

This application is a continuation-in-part of copending applications Serial No. 784,093, filed December 31, 1958, and Serial No. 787,379, filed January 15, 1959, both now abandoned.

We claim:
1. A sulfonamide compound selected from the group consisting of (a) compounds having the formula

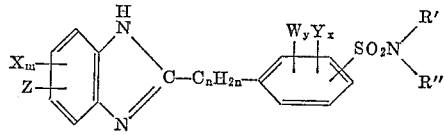

wherein X is selected from the group consisting of hydrogen, methyl, ethyl, chloro and bromo; Z is selected from the group consisting of hydrogen, nitro, amino, hydroxy, butyl, propyl, carboxy, carb-lower alkoxy, carbamoyl, alkali metal-oxycarbonyl, ammonium-oxycarbonyl, lower-alkylammonium-oxycarbonyl, lower hydroxyalkylammonium-oxycarbonyl and lower alkoxy containing from 1 to 4 carbon atoms, inclusive; Y is selected from the group consisting of hydrogen, bromo and chloro; W is selected from the group consisting of hydrogen and methyl; R' is selected from the group consisting of hydrogen, and lower alkyl containing from 1 to 4 carbon atoms, inclusive; R'' is selected from the group consisting of hydrogen, cyclohexyl, and lower alkyl containing from 1 to 4 carbon atoms, inclusive; m is an integer of from 1 to 2, inclusive; x is an integer of from 1 to 2, inclusive; y is an integer of from 1 to 2, inclusive; and n is an integer of from 1 to 3, inclusive; (b) compounds having the above formula wherein W, X, Y, Z, m, x, y and n are as above defined and wherein R' and R'' taken together is pentylene; and (c) mineral acid salts of (a) and (b).

2. α-(2-benzimidazolyl)-p-toluenesulfonamide.
3. α-(5 - chloro - 2 - benzimidazolyl)-p-toluenesulfonamide.
4. α-(5-chloro-2-benzimidazolyl)-N,N-dimethyl-p-toluenesulfonamide.
5. p - (2 - (5 - methyl - 2 - benzimidazolyl)ethyl) - N,N-dimethylbenzenesulfonamide.
6. α - (5 - hydroxy - 2 - benzimidazolyl) - p - toluenesulfonamide.
7. α - (5 - methyl - 2 - benzimidazolyl) - p - toluenesulfonamide.
8. α - (5 - methyl - 2 - benzimidazolyl) - 3 - chloro - p - toluenesulfonamide.
9. 2-(p-sulfamoylbenzyl) - 5 - benzimidazolecarboxylic acid.
10. α - (5-methyl - 2 - benzimidazolyl) - 2 - chloro - p - toluenesulfonamide.
11. A process for preparing a sulfonamide compound selected from the group consisting of (a) compounds having the formula

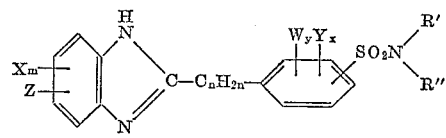

wherein X is selected from the group consisting of hydrogen, methyl, ethyl, chloro and bromo; Z is selected from the group consisting of hydrogen, nitro, amino, hydroxy, butyl, propyl, carboxy, and lower alkoxy containing from 1 to 4 carbon atoms, inclusive; Y is selected from the group consisting of hydrogen, bromo and chloro; W is selected from the group consisting of hydrogen and methyl; R' is selected from the group consisting of hydrogen and lower alkyl containing from 1 to 4 carbon atoms, inclusive; R'' is selected from the group consisting of hydrogen, cyclohexyl and lower alkyl containing from 1 to 4 carbon atoms, inclusive; m is an integer of from 1 to 2, inclusive; x is an integer of from 1 to 2, inclusive; y is an integer of from 1 to 2, inclusive; and n is an integer of from 1 to 3, inclusive; (b) compounds having the above formula wherein W, X, Y, Z, x, y, m and n are as above defined and wherein R' and R'' taken together is pentylene, and (c) mineral acid salts of (a)

and (b), which comprise heating together an o-phenylenediamine compound having the structure

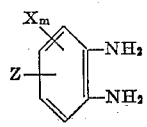

with a sulfamoylphenylalkanoic acid compound having the structure

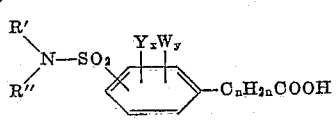

in the presence of a mineral acid catalyst in the temperature range of from 80° to 110° C.

References Cited in the file of this patent

Charlton et al.: Chem. Abstracts, vol. 46, col. 2005 (1952).

Elderfield: Heterocyclic Compounds, vol. 5, pages 273–278 (1957).